(12) United States Patent
Hosono et al.

(10) Patent No.: US 7,245,051 B2
(45) Date of Patent: Jul. 17, 2007

(54) THREE-PHASE BRUSHLESS MOTOR

(75) Inventors: Toshikazu Hosono, Shizuoka-ken (JP); Yoshiki Kumagai, Fujieda (JP)

(73) Assignee: Victor Company of Japan, Limited, Yokohama (JP)

( * ) Notice: Subject to any disclaimer, the term of this patent is extended or adjusted under 35 U.S.C. 154(b) by 189 days.

(21) Appl. No.: 11/216,015

(22) Filed: Sep. 1, 2005

(65) Prior Publication Data
US 2006/0049703 A1    Mar. 9, 2006

(30) Foreign Application Priority Data
Sep. 3, 2004  (JP) ............................. P2004-257061

(51) Int. Cl.
*H02K 11/00* (2006.01)
(52) U.S. Cl. .............. 310/68 B; 310/67 R; 310/156.05
(58) Field of Classification Search .............. 310/68 B, 310/68 R, 67 R, 156.05–156.07, 254, 261
See application file for complete search history.

(56) References Cited

U.S. PATENT DOCUMENTS

| 4,801,830 A | * | 1/1989 | Ogino et al. .............. 310/68 B |
| 5,408,153 A | * | 4/1995 | Imai et al. ................. 310/68 B |
| 5,610,457 A | * | 3/1997 | Kurita ....................... 310/68 B |
| 5,903,074 A | * | 5/1999 | Matsuzawa et al. ....... 310/68 B |
| 6,144,126 A | * | 11/2000 | Kodama .................... 310/68 B |
| 6,417,587 B1 | * | 7/2002 | Komatsu et al. ........... 310/68 B |
| 6,856,054 B2 | * | 2/2005 | Shukuri et al. ............ 310/68 B |
| 7,095,155 B2 | * | 8/2006 | Takeuchi .................... 310/266 |

FOREIGN PATENT DOCUMENTS

JP   08 322287   12/1996

* cited by examiner

*Primary Examiner*—Thanh Lam
(74) *Attorney, Agent, or Firm*—The Nath Law Group; Jerald L. Meyer; Derek Richmond

(57) ABSTRACT

A three-phase brushless motor in one mode of the present invention is comprised of a rotation axis, a rotor yoke rotating around said rotation axis, a drive magnet formed into a ring shape and attached on said rotor yoke, said drive magnet having a plurality of magnetized poles at an equal magnetization pitch angle Pm, a plurality of drive coils disposed so that the center of each said drive coil is at angular intervals of a predetermined arrangement angle Pc, the angle Pc being 4/3 times said magnetization pitch angle Pm, a rotation detecting magnet attached on said rotor yoke, and a magnetic sensor attached opposing said rotation detecting magnet so as to detect a magnetic flux of said rotation detecting magnet, wherein said magnet sensor is disposed at a position in which a magnetic flux from said drive magnet and a magnetic flux from said drive coils are canceled with each other.

4 Claims, 9 Drawing Sheets

(MODIFICATION OF THE FIRST EMBODIMENT)

(EMBODIMENT 1)

FG PULSES (MODIFICATION OF THE FIRST EMBODIMENT)

ONE CYCLE PULSE (SECOND EMBODIMENT)

(MODIFICATION OF SECOND EMBODIMENT)

THREE-PHASE BRUSHLESS MOTOR

BACKGROUND OF THE INVENTION

1. Field of the Invention

The present invention relates to a three-phase brushless motor composed of a plurality of drive coils attached on a stator substrate, a ring shaped drive magnet that opposes the drive coils with a slight gap therebetween and is firmly fixed on a rotor yoke to be rotatable with a rotation axis, the drive magnet having a plurality of magnetized poles, a magnet that is firmly fixed on the rotor yoke and has the different number of magnetized poles from the number of poles in the drive magnet so as to obtain FG pluses or one rotation pulse, and a magnetic sensor that opposes the magnet and is disposed at a position on the stator substrate, the position being free from an influence of magnetic fluxes from the drive coil and the drive magnet.

2. Description of the Related Art

In the past, a three-phase brushless motor has been used in various electrics devices. For example, the motor is often used as a capstan motor of a Video Tape Recorder (VTR) and a motor for a magnetic disc drive.

One example of such a brushless motor is constructed in order to reduce a start time of the motor (See Japanese Patent Application Publication No. H08-322287/1996).

FIG. 1 is a cross section illustrating a related art brushless motor. FIG. 2 is a schematic view illustrating a position of a drive coil and an FG sensor in relation to a drive magnet in the related art brushless motor. FIG. 3 is a view illustrating one example of an MR element pattern applicable to the FG sensor. FIG. 4 is a view illustrating an equivalent circuit of the MR element applicable to the FG sensor. A related art brushless motor 100 illustrated in FIG. 1 is disclosed in Japanese Patent Application Publication No. H08-322287. Referring to the publication, the motor will be briefly described.

As shown in FIG. 1, the related art motor 100 is composed of a stator and a rotor. The motor 100 is configured as a capstan motor.

The stator is composed of a bearing holder 103 that has a pair of bearings 102 fitted in an upper and a lower portion thereof and is attached on a stator substrate 101, a plurality of drive coils 104 that are attached substantially concentrically with a rotation axis 106 passing through the pair of bearings 102 so as to surround the bearing holder 103, and an FG sensor 105 disposed in an outside of one of the drive coils 104 so as to oppose an FG magnet 110 (described later).

On the other hand, the rotor is composed of the rotation axis 106 that passes through the pair of bearings 102 fitted in the bearing holder 103, a cup-shaped rotor yoke 108 that is attached on a bushing 107 fixed on an upper end of the rotation axis 106 so as to be rotatable in unison with the rotation axis 106, a ring-shaped drive magnet 109 that has a plurality of magnetized poles and is fixed along an inner wall surface of the rotor yoke 108, and a ring-shaped FG magnet 110 that has a plurality of magnetized poles, the number of which is different from that of the drive magnet 109, and is fixed along an outer circumferential of the rotor yoke 108 in order to obtain an FG pulse (rotation speed signal). The drive magnet 109 and the FG magnet 110 are rotatable in unison with the rotor yoke 108.

The plurality of the drive coils 104 attached on the stator substrate 101 oppose the ring-shaped drive magnet 109 firmly fixed along the inner wall surface of the rotor yoke 108, maintaining a slight gap therebetween in the vertical direction. A rotational drive force of the brushless motor 100 is produced therebetween.

In this case, the ring-shaped drive magnet 109 firmly fixed along the inner wall surface of the rotor yoke 108 is magnetized in such a way that, for example, eight poles (four pairs of magnetized poles) sector-shaped zones that are disposed at the equal angular intervals so as to surround the rotation axis 106 are alternatingly magnetized to North pole and South pole. In the drive magnet 109, a pair of magnetized poles composed of one North pole and one South pole is disposed at an angle of 360 degrees ($2\pi$ radian) in electrical angle. The electrical angle is used to represent an angle by defining an angle between a pair of neighboring magnetized poles (North pole and South pole) as $2\pi$ radian (rad).

In addition, as illustrated in FIG. 2, the plurality of the drive coils 104 are composed of U-phase, V-phase, and W-phase, each of which is connected to each phase of three-phase electricity. An arrangement pitch angle of two neighboring drive coils 104 arranged next to each other is set as 240 degrees ($4\pi/3$ radian) in electrical angle.

The FG magnet 110 firmly fixed along the outer circumferential of the rotor yoke 108 is magnetized so as to create multiple poles. The FG sensor 105 opposes the FG magnet 110. The FG sensor 105 used here is a so-called MR (magnetic resistance) element composed by arranging a material into a pattern shown in FIG. 3, the material changing its resistance upon application of an outer magnetic field. Apparently from the equivalent circuit of the sensor illustrated in FIG. 4, the device outputs a voltage across a terminal P1 and a terminal P2 depending on the intensity of the outer magnetic field when a predetermined voltage is applied between Vcc and GND, because each resistance in the circuit varies in accordance with the intensity of the magnetic field. With the above configuration, a plurality of FG pulses per one rotation are obtained by measuring the voltage that the FG sensor 105 outputs across the terminals P1 and P2 by detecting a magnetic flux originated from the FG. By the way, the reason why the MR element pattern is so complicated as illustrated in FIG. 3 and an electrical potential difference between the terminals P1 and P2 is to be measured is to cancel an influence of magnetic flux from any magnetic sources except for the FG magnet 110 so as not to output a voltage causing therefrom and to reduce an influence caused from a partial abnormality happening in magnetization in the FG magnet.

While the voltage across the terminals P1 and P2 of the FG sensor (MR element) 105 is measured to obtain a plurality of FG pulses, a leakage flux from the drive magnet 109 interlineating the FG sensor 105 is detected so as to be utilized as a start-up signal determining which coil has to be energized when starting up the brushless motor 100. As illustrated in FIG. 2, the FG sensor 105 is arranged at a position away from the center of the U-phase coil by 15 degree+180 degree×N1 (N1: integer) in electrical angle or a position away from the center of the W-phase coil by 75 degree+180 degree×N2 (N2: integer). The FG sensor (MR element) 105 takes a sum of the voltage across the terminals P1 and P2 to detect a position of the drive magnet 109. Therefore, it is found that which one among the drive coils 104 has to be energized when starting-up. As a result, a normal rotation takes place always to obtain counter electromotive force, thereby reducing a start time of the brushless motor 100 as described in the publication.

By the way, in the related art brushless motor 100, although a start-up performance has been improved since the FG sensor 105 is arranged at the position as described above to actively utilize the leakage magnetic flux from the drive magnet 109 interlinkaging the FG sensor 105, an inherent function of the FG sensor 105 is sacrificed.

Namely, the FG sensor 105 is to obtain a plurality of FG pulses per one rotation by detecting magnetic flux from the FG magnet 110. The leakage flux from the drive magnet 109 and the drive coil 104 has an adverse effect on FG pulses as a signal.

The MR element used as the FG sensor 105 is taken a measure to reduce an influence exerted by outer magnetic field. However, polarity and intensity of the leakage flux from the drive magnet 109 and the drive coils 104 change during rotation of the brushless motor 100 although the cycle thereof is longer than that of magnetic flux produced by the FG magnet. In addition, the detection areas inside the MR element (the FG sensor 105) are not just a point but has a width as shown in FIG. 3 and only the areas situated mutually at a different position inside the MR element can serve to cancel the outer magnetic field. Therefore, when the leakage flux changing its intensity greatly directly opposes the MR element (FG sensor 105), the MR element cannot cancel the leakage flux properly, resulting in an occurrence of an error in the FG pulse as an output of the MR element.

Such an error taking place in the FG pulse leads to a disadvantage in that the rotation speed of the brushless motor 100 is not stably controlled.

Therefore, there has been desired a small three-phase brushless motor comprised by arranging a plurality of drive coils attached on a stator substrate and a ring-shaped drive magnet magnetized to create a plurality of magnetized poles, the ring-shaped drive magnet being firmly fixed to a rotor yoke, so as to oppose mutually leaving a slight gap therebetween; by supporting rotatably the rotor yoke integrally with a rotation axis; by firmly fixing a magnet to the rotor yoke, the magnet having the different number of magnetized poles from that of the drive magnet for obtaining an FG pulse or one rotation pulse; and by attaching a magnetic sensor on the stator substrate so as to oppose the magnet; whereby the FG pulse or one rotation pulse is appropriately detected by the magnetic sensor.

SUMMARY OF THE INVENTION

A first aspect of the present invention provides a three-phase brushless motor comprising a rotation axis, a rotor yoke rotating around the rotation axis, a drive magnet formed into a ring shape and attached on the rotor yoke, the drive magnet having a plurality of magnetized poles at an equal magnetization pitch angle Pm, a plurality of drive coils disposed so that said drive coils oppose said drive magnet and the center of each the drive coil is at angular intervals of a predetermined arrangement angle Pc, the angle Pc being 4/3 times the magnetization pitch angle Pm, a rotation detecting magnet attached on the rotor yoke, and a magnetic sensor attached opposing the rotation detecting magnet so as to detect a magnetic flux of the rotation detecting magnet, wherein the magnet sensor is disposed at a position in which a magnetic flux from the drive magnet and a magnetic flux from the drive coils are canceled with each other.

A second aspect of the present invention provides a brushless motor according to the first aspect, wherein the magnetic sensor is disposed so that a line passing through the center of one drive coil among the plurality of drive coils and the rotation axis lies in an angular range of (0.25+/−0.1) times the predetermined arrangement pitch angle Pc with respect to a line passing through the center of the magnetic sensor and the rotation axis, the one drive coil having another drive coil adjacent in an opposite direction of rotation of the rotation axis.

A third aspect of the present invention provides a brushless motor according to the first aspect, wherein the rotation detecting magnet has the different number of magnetized poles from the number of poles in the drive magnet and is a ring-shaped magnet attached on an outer circumferential of the rotor yoke.

A fourth aspect of the present invention provides a brushless motor as recited in claim 1, wherein the rotation detecting magnet has the different number of a pair of North pole and South pole from the number of poles in the drive magnet and is a narrow magnet attached on an outer circumferential of the rotor yoke so as to generate one rotation signal.

DESCRIPTION OF THE PREFERRED EMBODIMENT

Referring to FIGS. 5 to 16, a brushless motor according to a first and a second embodiment of the present invention will be described in detail in the order.

First Embodiment

Figure 5:
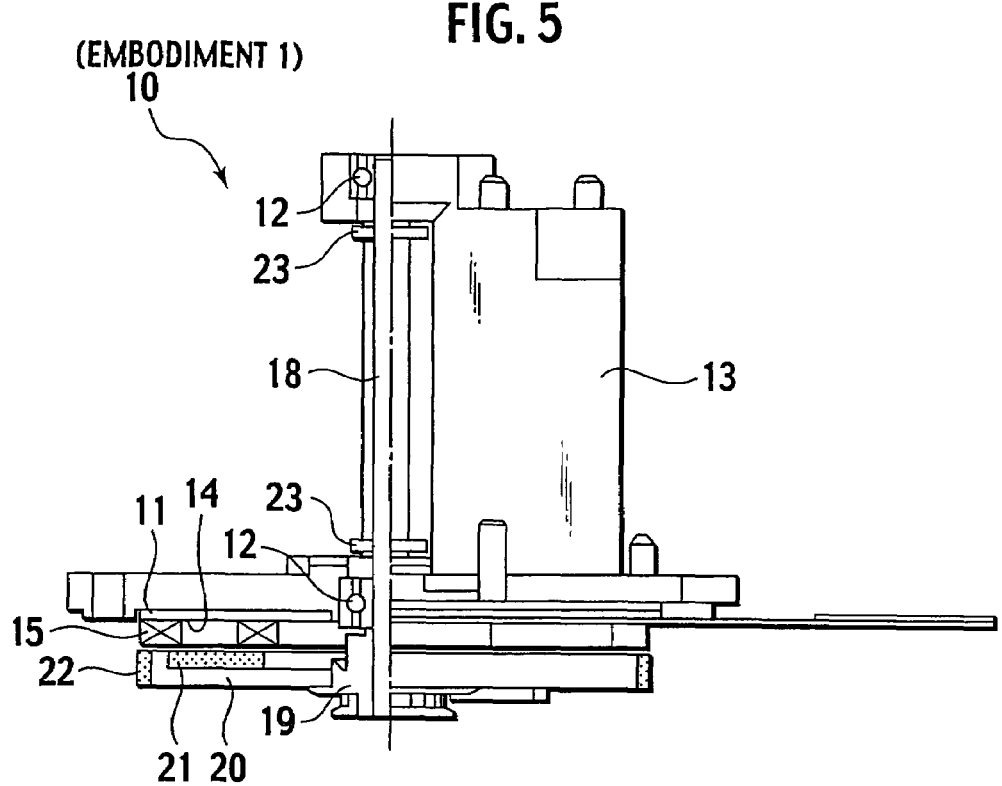
FIG. 5 is a schematic view explanatory illustrating a brushless motor according to a first embodiment of the present invention, in which one half from a center axis is shown in cross section.
Figure 6:
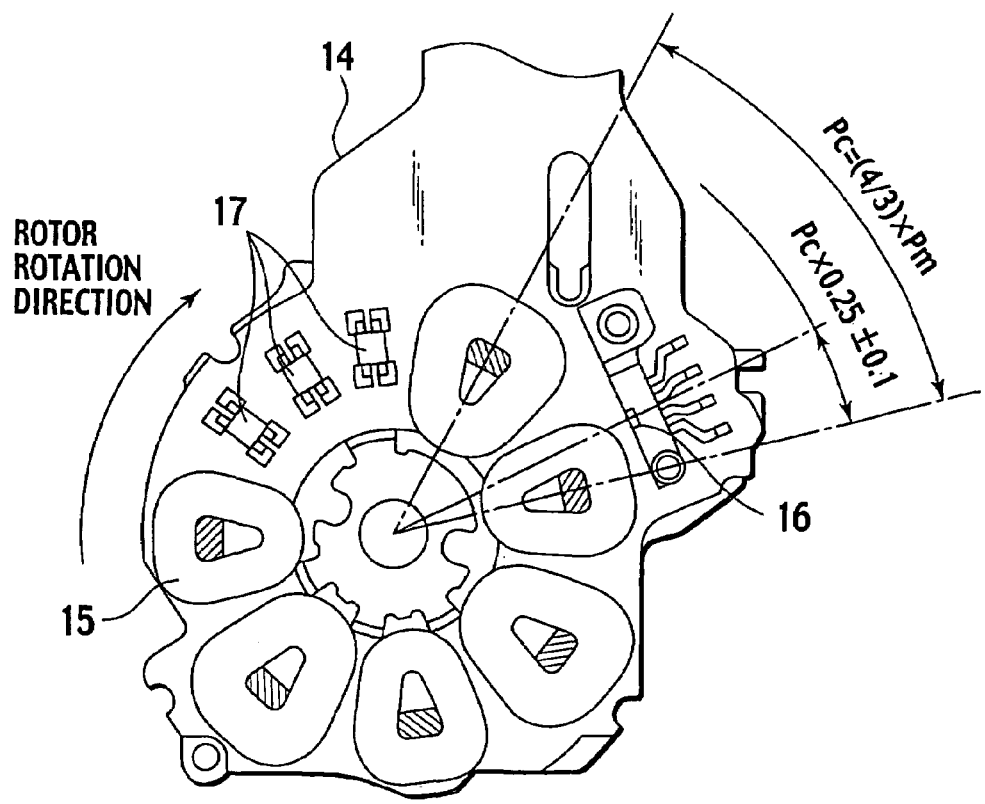
FIG. 6 is a plane view illustrating a flexible print-circuit board in the brushless motor according to the first embodiment of the present invention.
Figure 7:
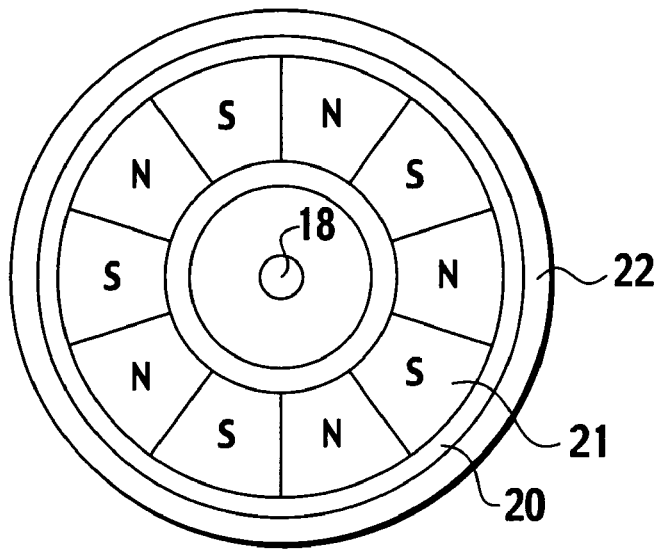
FIG. 7 is a plane view illustrating how a drive magnet is magnetized in the brushless motor according to the first embodiment of the present invention.
Figure 8:
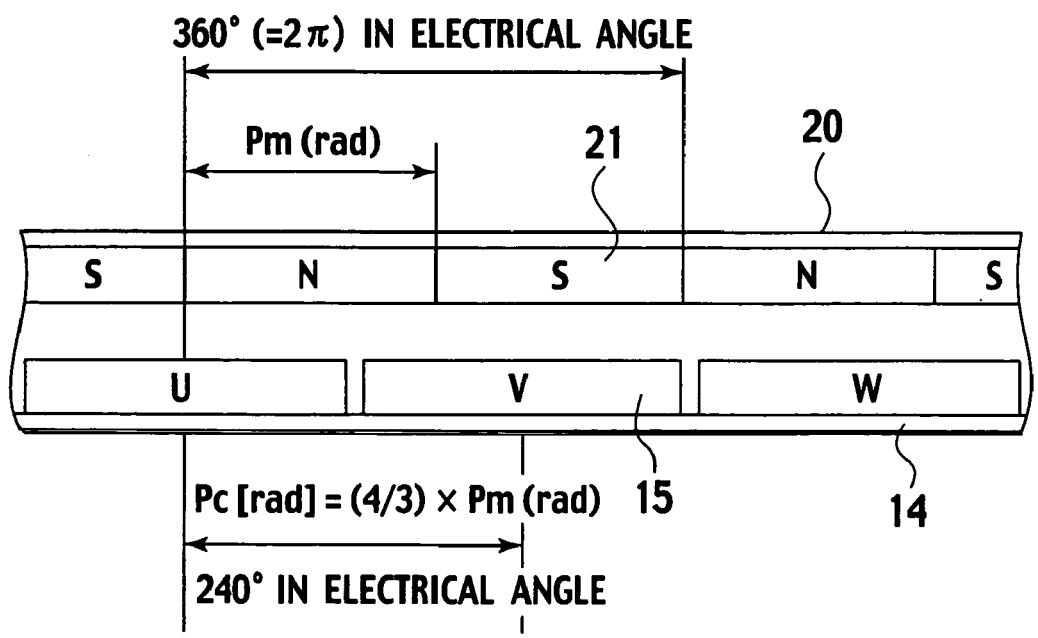
FIG. 8 is a schematic view illustrating a relation between drive coils and the drive magnet in the brushless motor according to the first embodiment of the present invention.
Figure 9:
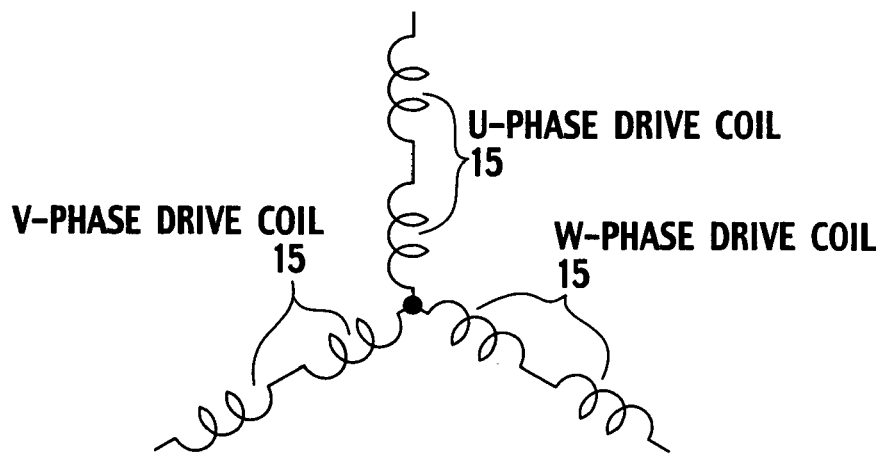
FIG. 9 is a circuit diagram outlining a three-phase star connection of U-phase, V-phase, and W-phase in the brushless motor according to the first embodiment of the present invention.
Figure 10A:
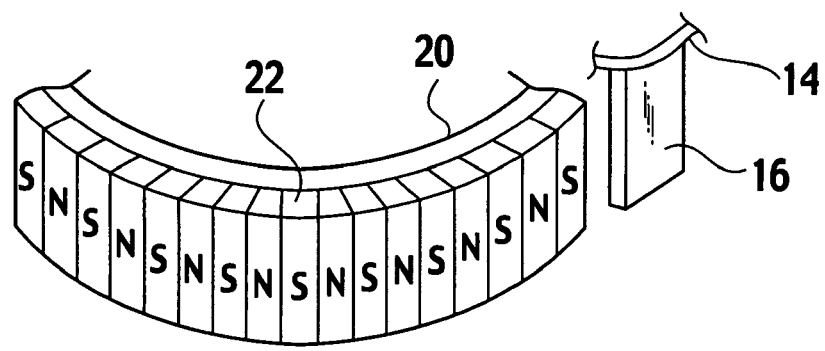
FIG. 10A is a perspective view illustrating an MR element and also how an FG magnet is magnetized in the brushless motor according to the first embodiment of the present invention.
Figure 10B:
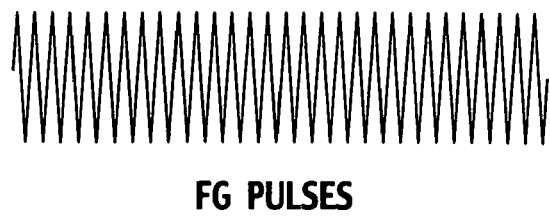
FIG. 10B is a waveform chart of FG pulses in the brushless motor according to the first embodiment of the present invention.
Figure 11:
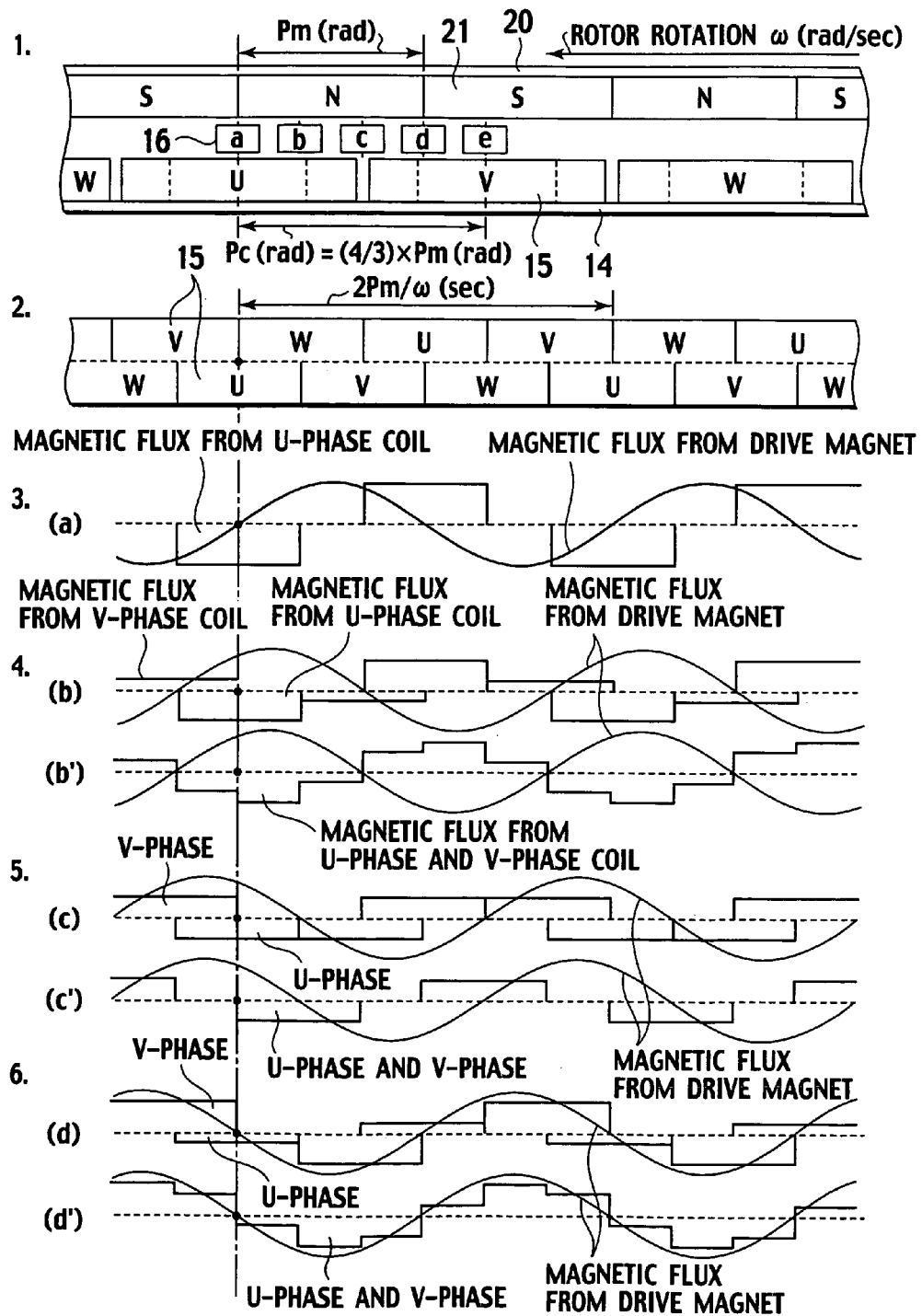
FIG. 11 is a view explanatory illustrating an arrangement angle of the MR element for detecting the FG pulses in the brushless motor according to the first embodiment of the present invention.
Figure 12:
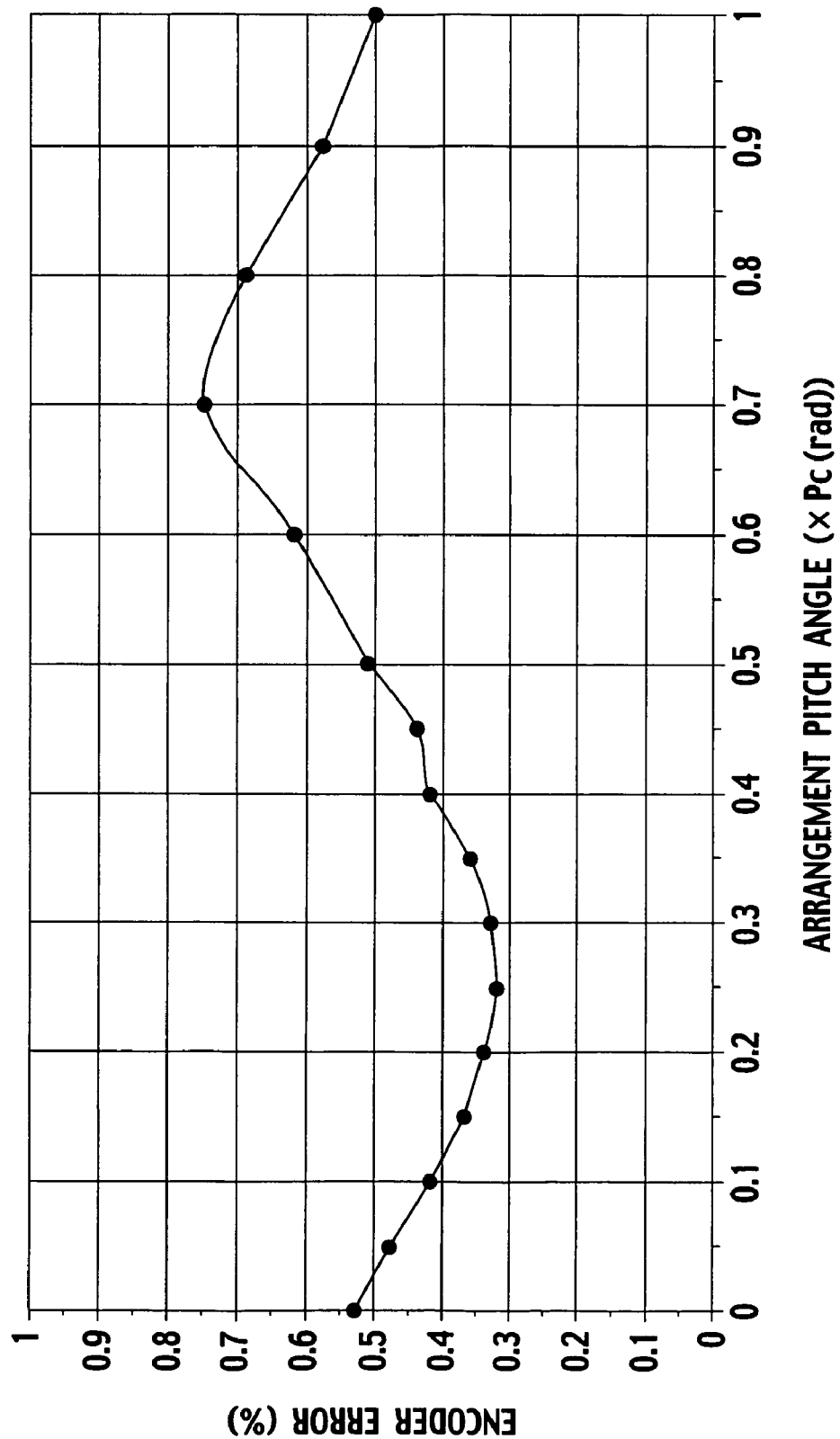
FIG. 12 is a view illustrating actually measured data of an encoder error caused depending on the attachment position of the MR element according to the first embodiment of the present invention.

FIG. 5 is a schematic view explanatory illustrating a brushless motor according to the first embodiment of the present invention, in which one half from a center axis is shown in cross section. FIG. 6 is a plane view illustrating a flexible print-circuit board in the brushless motor according to the first embodiment of the present invention. FIG. 7 is a plane view illustrating how a drive magnet is magnetized in the brushless motor according to the first embodiment of the present invention. FIG. 8 is a schematic view illustrating a relation between drive coils and the drive magnet in the brushless motor according to the first embodiment of the present invention. FIG. 9 is a circuit diagram outlining a three-phase star connection of U-phase, V-phase, and W-phase in the brushless motor according to the first embodiment of the present invention. FIG. 10A is a perspective view illustrating an MR element and also how an FG magnet is magnetized in the brushless motor according to the first embodiment of the present invention. FIG. 10B is a waveform chart of FG pulses in the brushless motor according to the first embodiment of the present invention. FIG. 11 is a view explanatory illustrating an arrangement angle of the MR element for detecting the FG pulses in the brushless motor according to the first invention of the present invention. FIG. 12 is a view illustrating actually measured data of an encoder error caused depending on the attachment position of the MR element according to the first embodiment of the present invention.

As illustrated in FIG. 5, the brushless motor 10 according to the first embodiment of the present invention is composed of a stator as a stable portion and a rotor as a rotating portion. The brushless motor 10 can be used, for example, as a capstan motor for use in a video tape recorder (VTR).

The stator, which is stable during operation, is composed by attaching a bearing holder 13 having a pair of bearings 12 fitted in an upper and a lower portion thereof above an upper face of a plate-like motor base 11 composed of soft magnetic iron.

On a flexible print circuit board 14 affixed on a lower face of the motor base 11, a plurality (for example, six) of drive coils 15 are disposed so as about to concentrically surround a rotation axis (shaft) 18 passing through a pair of bearings 12 fitted in the bearing holder 13, as illustrated in FIG. 6. There is provided an MR element 16 as a magnetic sensor for detecting FG pulses in an outside of one drive coil 15 as opposed to an FG magnet 22 (described later). The MR element 16 for detecting FG pulses is configured so as to have substantially the same configuration as described in the background section with reference to FIGS. 3 and 4. In a space between the plurality of drive coils 15, that is, where the drive coil is absent, there are three Hall generators (Hall elements) 17 for switching coils to be energized. By the way, the motor base 11 and the flexible circuit board 14 affixed on the lower face of the motor base 11 constitute a stator substrate.

Referring back to FIG. 5, the rotor is composed of the rotation axis 18 passing through the pair of bearings 12 fitted in the bearing holder 13, a cup-shaped rotor yoke 20 that is attached in a busing 19 firmly fixed at a lower end of the rotation axis 18 and rotatable in unison with the rotation axis 18, a ring-shaped drive magnet 21 that is firmly fixed along the inner wall surface of the rotor yoke 20 and has a plurality (for example, 10 poles (5 pairs)) of magnetized poles, and a ring-shaped FG magnet 22 that is firmly fixed along the outer circumferential of the rotor yoke 20 for obtaining FG pulses (rotation speed signal) and magnetized so as to have multiple magnetized poles (for example, 294 poles, namely, 147 pairs) of which number is different from that of the drive magnet 21. The drive magnet 21 and the FG magnet 22 are rotatable in unison with the rotation axis 18. The aforementioned FG magnet 22 serves as a rotation detection magnet.

On an upper portion of the rotation axis 18, there is engaged a grease trap 23 for preventing grease in the upper one of the pair of bearings 12 from flowing down.

The six drive coils 15 attached on the flexible print circuit board 14 oppose the ring-shaped drive magnet 21 firmly fixed along the inner wall surface of the rotor yoke 20, maintaining a slight gap therebetween in the vertical direction. A rotational drive force of the brushless motor 10 is produced therebetween.

As illustrated in FIG. 7, the ring-shaped drive magnet 21 firmly fixed along the inner wall surface of the yoke 20 is magnetized so as to have for example ten sector-shaped poles that are magnetized alternatingly to North pole and South pole, the magnetized poles of a sector shape surrounding the rotation axis 18. A magnetization pitch angle corresponding to an individual pole (North pole or South pole) is defined as Pm (rad). When the magnetization pitch angle between the two neighboring poles (North pole or South pole) in the drive magnet 21 is represented in geometric angle, an angle of 36 degree (360 divided by 10) is obtained, whereas when represented in electrical angle an angle of 180 degree ($\pi$ (rad)) is obtained. As mentioned above, the electrical angle is used to represent an angle by defining an angle between a pair of neighboring magnetized poles (North pole and South pole) as $2\pi$ (rad).

On the other hand, three of the six drive coils 15 attached on the flexible print circuit board 14 constitute one set of U-phase, V-phase, and W-phase and two sets of the three drive coils 15 are disposed repeatedly, as illustrated in FIG. 6. Assuming that a arrangement pitch angle of two neighboring drive coils 15 is referred to as an angle defined by a line passing through the rotation axis 18 and the center of one drive coil 15 and another line passing through the rotation axis 18 and the center of the neighboring coil 15, the arrangement pitch angle is represented by Pc (rad) that is about 4/3×Pm (rad). In other words, the arrangement pitch angle of the two neighboring drive coils 15 is almost four-thirds (4/3) of the magnetization pitch angle Pm (rad) of an individual pole (North pole or South pole). Accordingly, three drive coils 15 are arranged in relation to two pairs of magnetized poles of the drive magnet 21. Therefore, the arrangement pitch angle of the drive coils 15 is represented as 48 degree in mechanical angle and as 240 degree (=4π/3) in electrical angle.

In this case, two of the six drive coils 15 are connected in series as U-phase; another two of the six drive coils 15 are connected in series as V-phase; and the remaining two of the six drive coils 15 are connected in series as W-phase, as illustrated in FIG. 9. Then, the three sets of the two drive coils are star-connected to the power supply.

As illustrated in FIG. 10A, the FG magnet 22 firmly fixed along the outer circumferential of the yoke 20 is magnetized so as to have multiple poles that are alternatingly magnetized to North pole and South pole. The number of the poles is for example 294 poles (147 pairs of magnetized poles) in this embodiment. A detecting of the magnetic flux from the FG magnet 22 by the MR element 16 attached on the flexible print circuit board 14 provides a plurality of FG pulses per rotation as illustrated in FIG. 10B.

The three Hall generator 17 (FIG. 6) attached in the space between the drive coils 15 detect the magnetic flux from the drive magnet 21 to serve to switch three phase current supplying to the U-phase, the V-phase, and the W-phase of the drive coils 15.

Next, an arrangement angle of the MR element (magnetic sensor) for detecting FG pulses, which is an essential part of the first embodiment, will be described with reference to FIG. 11.

Figure 1:
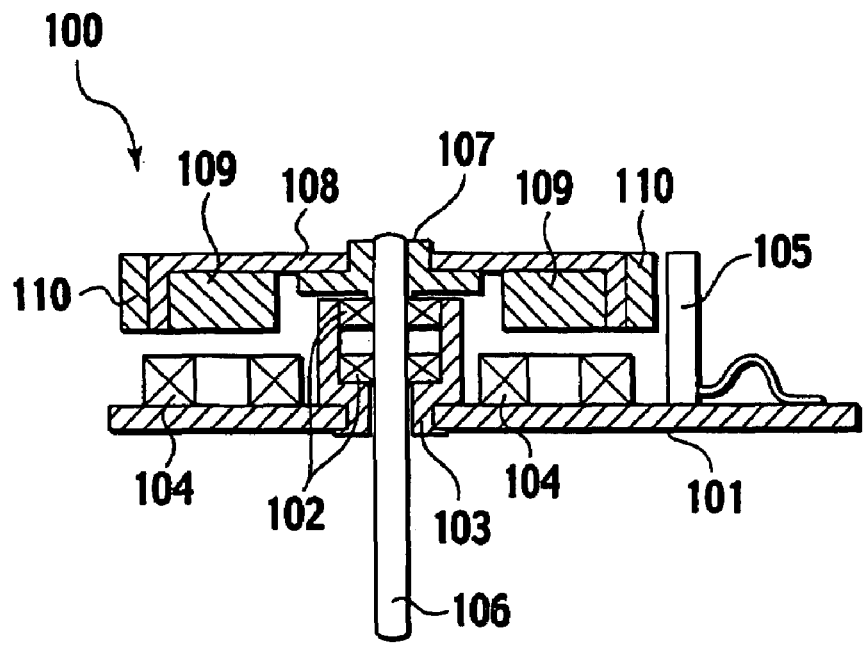
FIG. 1 is a cross section illustrating a related art brushless motor.

FIG. 11-1 illustrates a case in which there are a set of the drive coils 15 composed of U-phase, V-phase, and W-phase, the drive coil being attached on the flexible print circuit board 14 constituting the stator so as to oppose the drive magnet 21, when the rotor including the drive magnet 21 firmly fixed along the inner wall surface of the rotor yoke 20 rotates in a direction shown in FIG. 11-1 as a normal rotation direction at an angular speed of ω (rad/sec). FIG. 11-1 also illustrates a relation among the drive magnet 21, the plurality of drive coils 15, and the MR element 16 that opposes the FG magnet 22 firmly fixed along the outer circumferential of the yoke 20 (FIG. 5), the MR element 16 being tentatively illustrated between the drive magnet 21 and the plurality of drive coils 15.

Specifically, the MR element 16 can be arranged with reference to FIG. 11-1 as follows. Firstly, one drive coil 15 is chosen from the plurality of drive coils 15 except one having no neighboring drive coil behind in the rotation direction of the rotor (i.e., except the drive coil situated on the right hand side of the three Hall generators 17 in FIG. 6). Secondly, an imaginary line passing through the center of the chosen one drive coil 15 and the center of the rotation axis 18 (FIG. 5) supposedly coincides a boundary of a pair of North pole and South pole. The imaginary line is set as a reference line to be used when the MR element 16 is arranged. Thirdly, the MR element 16 can be tentatively situated at an a-position that is referred to as a starting point on the imaginary line, a b-position, a c-position, a d-position, and an e-position, wherein the positions except the a-position are angularly misaligned in a direction opposite to the rotation direction of the rotor from the reference line by Pc/4 (=Pm/3) (rad). Here, Pm (rad) is the magnetization pitch angle of the one magnetized pole (North or South) of the drive magnet 21 and Pc (=4/3×Pm) (rad) is the arrangement pitch angle of two neighboring drive coils 15.

Although the U-phase drive coil 15 is chosen as the one drive coil 15 in the following description, this is not intended to limit the present invention. The one drive coil 15 may be the V-phase or W-phase drive coil 15, as far as any of the drive coils 15 having another drive coil 15 behind in the rotation direction of the rotor is chosen as the one drive coil. Note that the drive coil situated on the right to the Hall generator 17 in FIG. 6 cannot be the one drive coil 15. In other words, the one drive coil 15 among the plurality of the drive coils 15 is any one of the drive coils 15 that have another neighboring drive coil 15 situated adjacent in the opposite direction of the rotation of the rotation axis 18.

Next, changes in the magnetic fluxes from the drive magnet 21 and the drive coil 15, the fluxes being to be measured by the MR element 16 that is assumed to be situated in the a-, b-, c-, and d-, and e-position, will be simulated, when an arrangement angle varies, the arrangement angle being defined by the center of the U-phase drive coil 15 (the one drive coil 15 for example), the center of the MR element 16 and the rotation axis. The a-position is the starting point when it is assumed that the center of the MR element 16 coincides with the center of the U-phase drive coil 15. The b-position is a point that is Pc/4 (=Pm/3) (rad) away from the a-position (starting point) in the clockwise direction. The c-position is a point that is Pc/4 (=Pm/3) (rad) away from the b-position in the clockwise direction. The d-position is a point that is Pc/4 (=Pm/3) (rad) away from the c-position in the clockwise direction. The e-position is a point that is Pc/4 (=Pm/3) (rad) away from the d-position in the clockwise direction.

As apparent from the above description, since the e-position coincides with the center of the V-phase coil 15, the e-position is equivalent with the a-position (starting point). Because of this, the e-position will not be mentioned in the following description.

Figure 2:
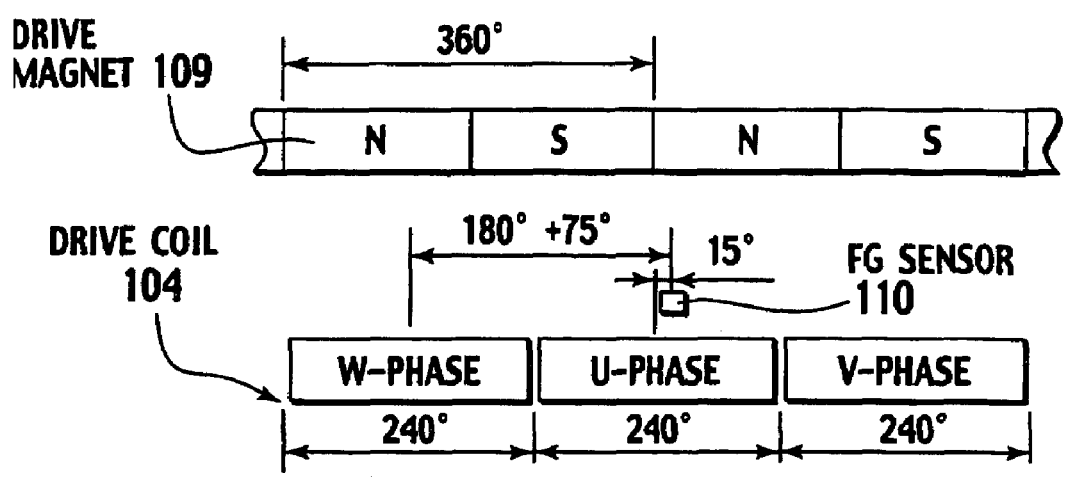
FIG. 2 is a schematic view illustrating a position of a drive coil and an FG sensor in relation to a drive magnet in the related art brushless motor.

As illustrated in FIG. 11-2, the drive coils 15 composed of the U-phase, the V-phase, and the W-phase are energized by a rectangular wave voltage in three phase bi-directional operation.

Figure 3:
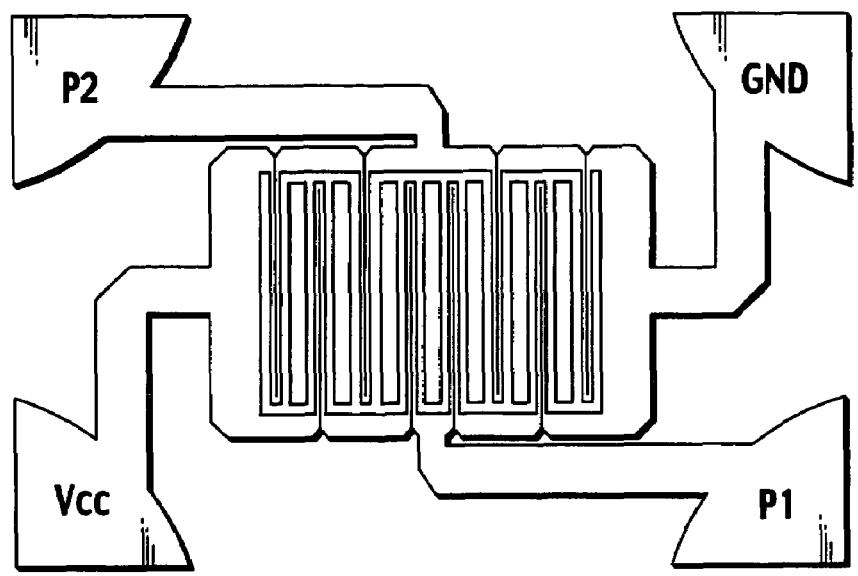
FIG. 3 is a view illustrating one example of an MR element pattern applicable to the FG sensor.

FIGS. 11-3 to 11-6 illustrate the simulation results of each magnetic flux from the drive coil 15 and the drive magnet 21, which is to be detected by the MR element 16 disposed at each arrangement position. In the figures, FG pulses (rotation speed signal) from the FG magnet 22 (FIG. 5) that has essentially detected by the MR element 16 are curtailed.

First, as illustrated in FIG. 11-3, when the MR element 16 is disposed at the a-position (starting point), the arrangement angle becomes 0 (rad). The MR element 16 at the a-position detects the flux from the U-phase drive coil 15 only among the three coils and the flux from the drive magnet 21.

Figure 4:
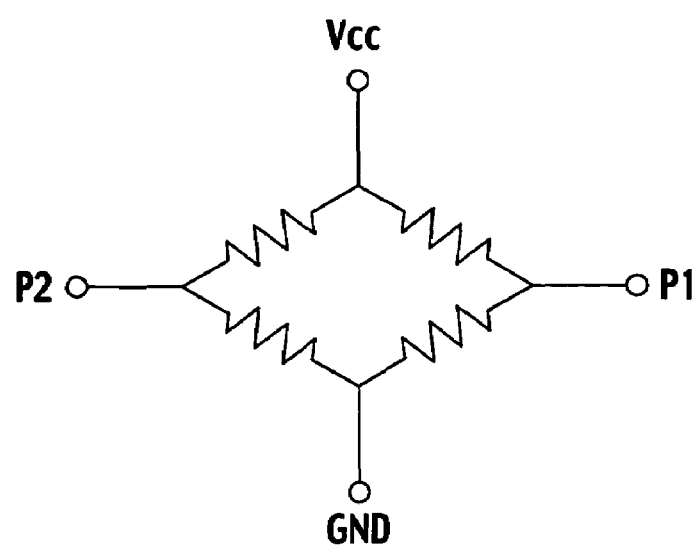
FIG. 4 is a view illustrating an equivalent circuit of the MR element applicable to the FG-sensor.

Next, as illustrated in FIG. 11-4(*b*), when the MR element 16 is disposed at the b-position, the arrangement angle becomes Pc/4 (rad). The MR element 16 at the b-position detects a strong flux from the U-phase drive coil 15 among the three coils, a weak flux from the V-phase drive coil 15, which is different in phase from the U-phase, and the flux from the drive magnet 21. In this case, as illustrated in FIG. 11-4(*b'*), the MR element 16 detects a superposition of the magnetic flux from the U-phase drive coil 15 and the magnetic flux from the V-phase drive coil 15. This superposed magnetic flux is in opposite phase with the flux from the drive magnet 21. Therefore, the magnetic flux form drive magnet 21 and the superposition of the magnetic fluxes from the drive coils 15 are canceled. As a result, the MR element 16 can detect only an extremely small magnetic flux from the drive coils 15 and the drive magnet 21. Accordingly, when the MR element 16 is disposed at the b-position, since the magnetic fluxes from the U-phase drive coil 15, the V-phase drive coil 15, and the drive magnetic coil 21 are mutually offset, the MR element 16 is capable of surely detecting the magnetic flux from the FG magnet 22 (FIG. 5), thereby obtaining high integrity FG pulses.

When the MR element 16 is disposed at the c-position, the arrangement angle becomes Pc/2 (rad) as illustrated in FIG. 11-5(*c*). The MR element 16 detects a superposition of the magnetic flux from the U-phase drive coil 15 and the magnetic flux from the V-phase coil 15 that has the same magnetic intensity and a different phase as illustrated in FIG. 11-5(*c'*). It should be noted that a superposition of the magnetic fluxes from the two drive coils 15 and the drive magnet 21 ends up to be larger than that in the above case, as understood from FIGS. 11-4(*b'*) and 11-5(*c'*).

When the MR element 16 is disposed at the d-position, the arrangement angle becomes 3×Pc/4 (rad) as illustrated in FIG. 11-6(*d*). The MR element 16 at the d-position detects a weak magnetic flux from the U-phase drive coil 15, a strong magnetic flux from the V-phase drive coil 15 that has a different phase from the U-phase, and the magnetic flux from the drive magnet 21. Since a superposition of the magnetic flux from the U-phase drive coil 15 and the magnetic flux from the V-phase magnetic coil 15 are in the same phase as the magnetic flux from the drive magnet 21 as illustrated in FIG. 11-6(*d'*), the magnetic flux that the MR element 16 at the d-position detects in total becomes larger.

In order to verify the simulation results above with an improved accuracy, an encoder error that shows a detection error of the MR element (magnetic sensor) 16 as a rotation speed sensor has been measured. The measurement results are illustrated in FIG. 12. From FIG. 12, it has been found that a value of an encoder error is minimized when the arrangement angle between the center of one drive coil 15 concerned and the center of the MR element 16 with the rotation axis as its vortex is equal to one-fourths (0.25) of the arrangement pitch angle Pc (rad) of drive coils 15 (=Pc/4 (rad)). However, the preferable angle is not necessarily one-fourths of the arrangement pitch angle Pc (rad) but 0.25+/−0.1 of Pc (rad) is enough because the error value does not becomes minimum abruptly at the one-fourth of the angle Pc. Actually, there is only about 0.02% in encoder error within the range of 0.25+/−0.1 of Pc (rad).

Since the brushless motor 10 according to the first embodiment of the present invention is required to have an encoder error of 0.35% or less, the MR element 16 may be disposed at a position that satisfies 0.25+/−0.1 of the arrangement pitch angle Pc (rad) of the drive coils 15 in practical use.

In other words, the MR element (magnetic sensor) 16 is disposed so that a line passing through the center of the MR element 16 and the rotation axis 18 lies in an angular range of (0.25+/−0.1) times the arrangement pitch angle Pc (rad) with respect to a line passing through the center of one drive coil and the rotation axis 18, wherein the one drive coil is any one of the drive coils 15 that have another drive coil adjacent in the opposite direction of the rotation of the rotation axis 18, and wherein the arrangement pitch angle Pc (rad) is an angle between every two neighboring drive coils and is set as about 4/3 times the magnetization pitch angle of one magnetized pole of the drive magnet 21.

Due to the above configuration, since the MR element (magnetic sensor) 16 is free from an influence of the magnetic flux from the drive coil 15 and the drive magnet 21, the MR element 16 surely detects the magnetic flux from the FG magnet 22, thereby obtaining high integrity FG pulses. Therefore, an FG pulse error merely occurs and a rotation speed of the brushless motor 10 is stably controlled, thereby realizing an improved quality and reliability of the brushless motor 10.

Next, a modification obtained by modifying a part of the brushless motor 10 according to the first embodiment of the present invention will be explained with reference to FIGS. 13 and 14.

Figure 13:
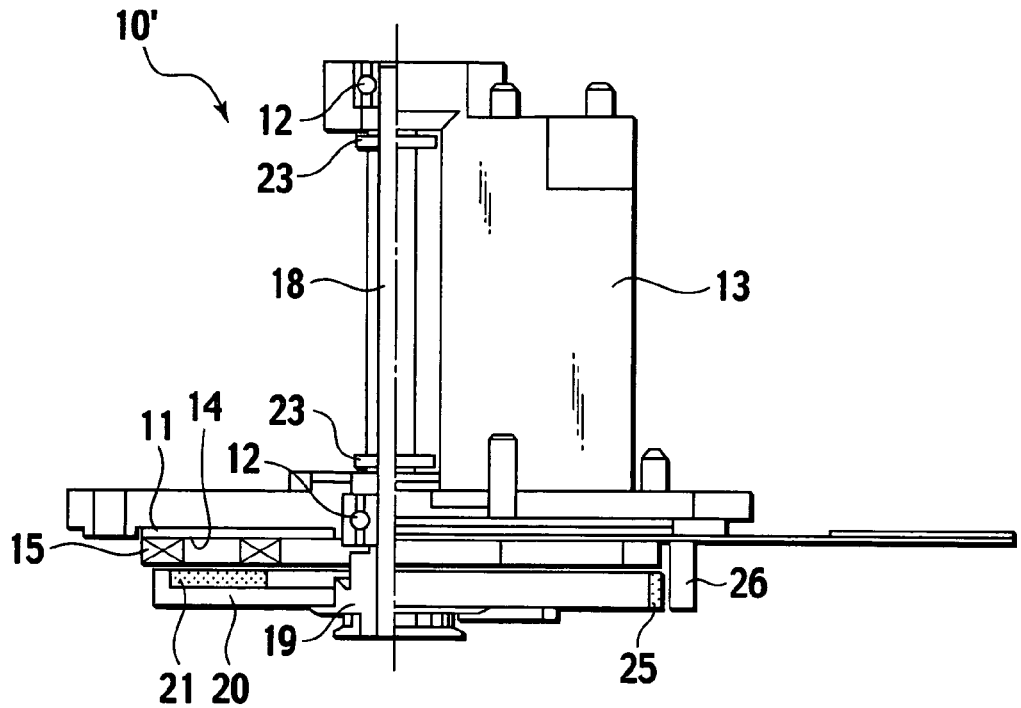
FIG. 13 is a schematic view explanatory illustrating a modification of the brushless motor according to the first embodiment of the present invention, in which one half from the center axis is shown in cross section.
Figure 14A:
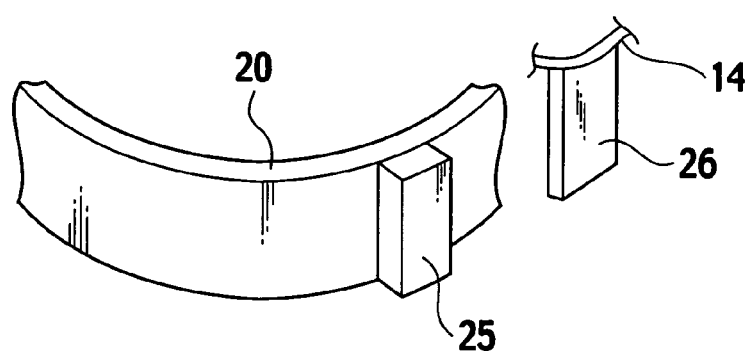
FIG. 14A illustrates a Hall generator for detecting one rotation pulse and a magnet for generation one rotation pulse in the modification of the first embodiment of the present invention.
Figure 14B:
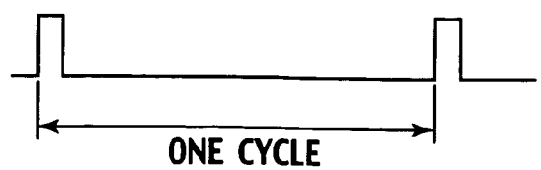
FIG. 14B illustrates a waveform diagram of the one rotation pulse in the modification of the first embodiment of the present invention.

FIG. 13 is a schematic view explanatory illustrating a modification of the brushless motor according to the first embodiment of the present invention, in which one half from the center axis is shown in cross section. FIG. 14A illustrates a Hall generator for detecting one rotation pulse and a magnet for generation one rotation pulse in the modification of the first embodiment of the present invention. FIG. 14B illustrates a waveform diagram of the one rotation pulse in the modification of the first embodiment of the present invention.

For convenience of description, the same reference marks are given to same members or components as those in the first embodiment and new reference marks are given to new members or components. Only the differences from the first embodiment will be described hereinafter.

As illustrated in FIGS. 13 and 14A, a brushless motor 10' as a modification of the first embodiment is different in that the magnet 25 for generating one rotation pulse is firmly fixed on an outer circumferential of the cup-shaped rotor yoke 20, the magnet 25 having a narrow width, instead of the FG magnet 22 having multiple poles (FIG. 5) of the brushless motor 10 according to the first embodiment as described above. In this case, the magnet 25 for one-rotation pulse generation serves as a rotation detection magnet, having pairs of magnetized poles having North pole on one side and South pole on the other side, the number of the pair of poles are different from that of the ring-shaped drive magnet 21 (for example, 10 poles (five pairs of magnetized poles) firmly fixed along the inner wall surface of the rotor yoke 20.

There is provided one Hall generator (Hall element) 26 for detecting one-rotation as a magnetic sensor on the flexible print circuit board 14, opposing the one-rotation pulse generation magnet 25 firmly fixed on the outer circumferential of the rotor yoke 20. The Hall generator 26 acquires a one-rotation pulse per one-rotation of the rotor yoke 20 as illustrated in FIG. 14B.

In this case, employing the same technical idea described above in the first embodiment with reference to FIG. 6, the Hall generator (magnetic sensor) 26 is disposed so that a line passing through the center of the Hall generator 26 and the rotation axis 18 lies in an angular range of (0.25+/−0.1) times the arrangement pitch angle Pc (rad) with respect to a line passing through the center of one drive coil and the rotation axis 18, wherein the one drive coil is any one of the drive coils 15 that have another drive coil adjacent in the opposite direction of the rotation of the rotation axis 18, and wherein the arrangement pitch angle Pc (rad) is an angle between every two neighboring drive coils among the drive coils and is set as about 4/3 times the magnetization pitch angle of one magnetized pole of the drive magnet 21.

Due to this configuration, the Hall generator (magnetic sensor) 26 for detecting one rotation pulse is able to surely detect the magnetic flux from the magnet 25 for generating one rotation pulse and to obtain high integrity one rotation pulse, since the Hall generator 26 are under a negligible influence of the magnetic fluxes from the drive coil 15 and the drive magnet 21.

Second Embodiment

Figure 15:
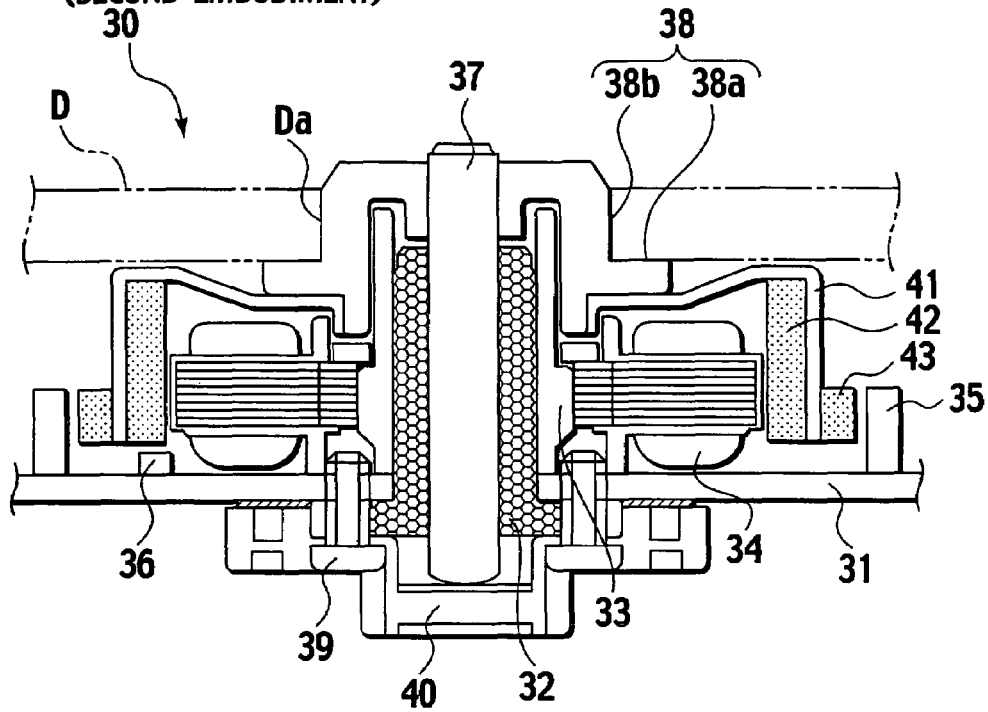
FIG. 15 is a cross section explanatory illustrating an entire configuration of a brushless motor according to a second embodiment of the present invention.

FIG. 15 is a cross section explanatory illustrating an entire configuration of a brushless motor according to a second embodiment of the present invention.

As illustrated in FIG. 15, a brushless motor 30 according to the second embodiment is composed of a stator and a rotor and intended to be used, for example, a magnetic disc drive motor.

The stator is composed of a stator substrate 31 as a base material, a bearing holder 33 vertically attached on an upper face of the stator substrate 31, an oilless bearing 32 fitted in the bearing holder 33, and a plurality (for example, six) of drive coils 34 attached at a constant angular intervals (for example, 60 degrees) along the outer circumferential of the bearing holder 33. The plurality of the drive-coils 34 are fastened on the stator substrate 31 so as to lie substantially concentrically with a rotation axis (shaft) 37 that passes through the oilless bearing 32.

On the stator substrate 31, an MR element 35 as a magnetic sensor for detecting FG pulses is attached so as to lie in an outer position of one drive coil 34 and to oppose an FG magnet 43 (described later). In addition, three Hall generators (Hall element) 36 for switching coils are respectively attached between neighboring drive coils 34, although only one Hall generator 36 is illustrated in FIG. 15, as a matter of convenience for illustration.

On the other hand, the rotor is composed of the rotation axis 37 that passes through the oilless bearing 32 fitted on the bearing holder 33 and a turn table 38 that is press-fitted on the upper end of the rotation axis 37. The turntable 38 is rotatable in unison with the rotation axis 37. In this case, the turntable 38 is composed integrally of a flange portion 38a having a disc-like shape and an axis portion 38b situated above the flange portion 38a. On the flange portion 38a, a magnetic disc D is rested on while the center hole Da of a magnetic disc D is fitted with the axis portion 38b having a diameter smaller than the flange portion 38a.

The lower end of the rotation axis 37 is supported by a cup-shaped holder member 40 attached on the reverse surface of the stator substrate 31 with a screw 39.

On the lower surface of the flange portion 38a of the turn table 38, there is attached a cylinder-shaped rotor yoke 41 integrally and concentrically with the turn table 38. In addition, a ring-shaped drive magnet 42 having a plurality (for example, eight (four pairs of magnetized poles)) of poles along the inner wall surface of the rotor yoke 41. Moreover, a ring-shaped FG magnet 43 is firmly fixed along the outer circumferential of the rotor yoke 41 in order to acquire FG pulses, the FG magnet 43 having multiple poles (for example, 294 poles (147 pairs of magnetized poles)) which are different in number from the drive magnet 41. The drive magnet 42 and the FG magnet 43 are rotatable in unison with the rotor yoke 41. In this case, the FG magnet 43 serves as a rotation detection magnet.

The six drive coils 34 provided in the stator oppose the ring-shaped drive magnet 42 firmly fixed along the inner wall surface of the rotor yoke 41, leaving a slight gap in a radius direction. With this configuration, a rotational drive force of the brushless motor 30 is produced therebetween.

Although the second embodiment is different from the first embodiment in that a) the six drive coils 34 provided in the stator are not shaped into a plate, b) all the six drive coils 34 are disposed at the equal angular intervals, and c) the drive magnet 42 has the different number of magnetized poles from that in the first embodiment, the same technical idea described above in the first embodiment with reference to FIG. 6 is also employed in the second embodiment. In the second embodiment, every one of the plurality of the drive coils 34 is disposed so as to have another drive coil situated behind in the rotation direction of the rotation axis 37.

The MR element (magnetic sensor) 35 is disposed so that a line passing through the center of the MR element 35 and the rotation axis 37 lies in an angular range of (0.25+/−0.1) times the arrangement pitch angle Pc (rad) with respect to a line passing through the center of one drive coil and the rotation axis 37, wherein the one drive coil is any one of the drive coils 34 that have another drive coil adjacent in the opposite direction of the rotation of the rotation axis 37, and wherein the arrangement pitch angle Pc (rad) is an angle between every two neighboring drive coils 34 and is set as about 4/3 times the magnetization pitch angle of one magnetized pole of the drive magnet 42. Due to this configuration, the MR element (magnetic sensor) 35 is under a negligible influence of the magnetic fluxes from the drive coil 34 and the drive magnet 42, thereby surely detecting the magnetic flux from the FG magnet 43 to acquire high integrity FG pluses.

Next, a partial modification of the brushless motor 30 according to the second embodiment of the present invention will be described with reference to FIG. 16.

Figure 16:
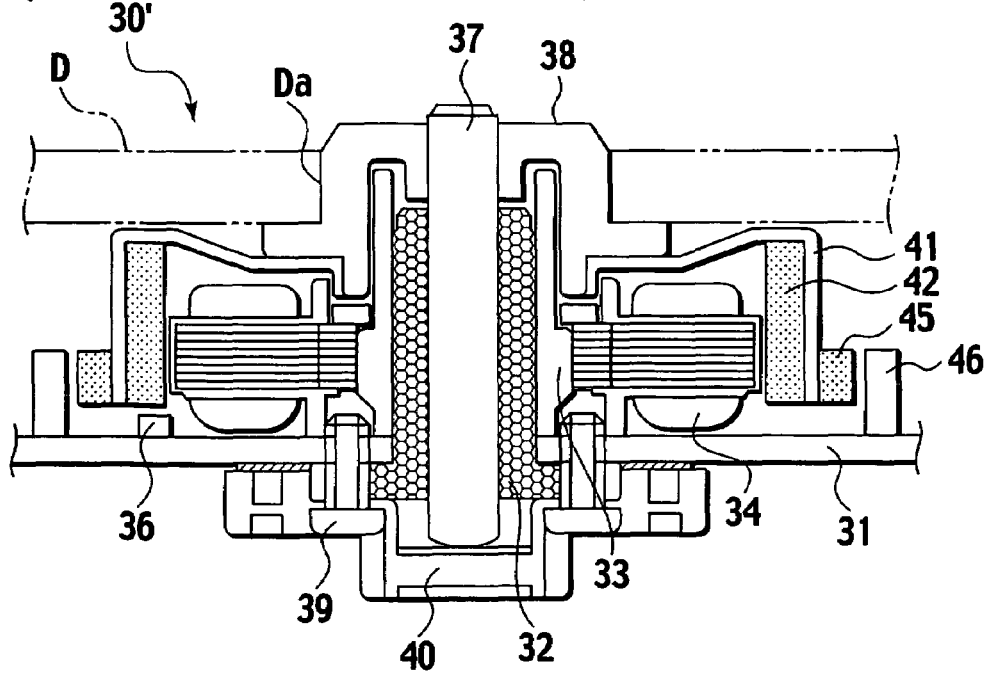
FIG. 16 is a cross section explanatory illustrating an entire configuration of the partial modification of the second embodiment of the present invention.

FIG. 16 is a cross section explanatory illustrating an entire configuration of the partial modification of the second embodiment of the present invention.

For convenience of description, the same reference marks are given to same members or components as those in the second embodiment and new reference marks are given to new members or components. Only the differences from the second embodiment will be described hereinafter.

As illustrated in FIG. 16, a brushless motor 30' obtained by modifying a part of the second embodiment is different from the brushless motor 30 of the second embodiment in that there is firmly fixed a narrow magnet 45 for generating one rotation pulse on the outer circumferential instead of the FG magnet 43 (FIG. 15) having multiple magnetized poles. In this case, the magnet 45 for generating one rotation pulse has a plurality of single poles having North pole on one side and South pole on the other side, the number of which is different from that in the ring-shaped drive magnet 42 that has for example eight poles (four pairs of magnetized poles), serves as a rotation detecting magnet.

In addition, there is provided a coil element 46 for detecting one rotation pulse, as a magnetic sensor, on the stator substrate 31. The coil element 46 opposes the magnet 45 for one rotation pulse generation firmly fixed on the outer circumferential of the rotor yoke 41. thereby acquiring one rotation pulse every time the rotor yoke 41 rotates once.

In this case, employing the same technical idea described above in the second embodiment, the coil element (magnetic sensor) 46 is disposed so that a line passing through the center of the coil element 46 and the rotation axis 37 lies in an angular range of (0.25+/−0.1) times the arrangement pitch angle Pc (rad) with respect to a line passing through the center of one drive coil and the rotation axis 37, wherein the one drive coil is any one of the drive coils 34 that have another drive coil adjacent in the opposite direction of the rotation of the rotation axis 37, and wherein the arrangement pitch angle Pc (rad) is an angle between every two neighboring drive coils 34 and is set as about 4/3 times the magnetization pitch angle of one magnetized pole in the drive magnet 42.

The brushless motors 10, 30 according to the first and the second embodiment, respectively, and the brushless motors 10', 30' as the modifications of the first and the second embodiment, respectively, can be driven under three phase bi-directional 120 degree energizing condition. However, other energizing angles, for example, 180 degree, can be employed as far as a timing of energization to each drive coil is unchanged. In addition, the brushless motors 10, 30, 10' and 30' can be driven by not only rectangular voltage but also trapezoidal wave voltage and sign wave voltage. This is because the phase of the applied voltage can be retained as described above even when waveforms of the magnetic flux are different. Therefore, the same operation and effect is demonstrated.

In addition, one embodiment describes the 6 drive coils and the drive magnet having 10 poles (5 pairs of magnetized poles), while the other describes the 6 drive coils and the drive magnet having 8 poles (4 pairs of magnetized poles). However, the number of the coils or the number of the poles of the drive magnet can be optional and the technical idea described in the first and the second embodiment are applicable as far as a plurality of drive coils are disposed at angular intervals of the about 4/3 times the magnetization pitch angle of the magnetized pole of the drive magnet.

Each embodiment described above is not intended to limit the present invention to the above configurations and procedures. The present invention can be, nothing to say, modified without departing from the scope and the sprit thereof.

What is claimed is:

1. A three-phase brushless motor comprising:
    a rotation axis,
    a rotor yoke rotating around said rotation axis,
    a drive magnet formed into a ring shape and attached on said rotor yoke, said drive magnet having a plurality of magnetized poles at an equal magnetization pitch angle Pm,
    a plurality of drive coils disposed so that said drive coils oppose said drive magnet and the center of each said drive coil is at angular intervals of a predetermined arrangement angle Pc, the angle Pc being 4/3 times said magnetization pitch angle Pm,
    a rotation detecting magnet attached on said rotor yoke, and
    a magnetic sensor attached opposing said rotation detecting magnet so as to detect a magnetic flux of said rotation detecting magnet,
    wherein said magnet sensor is disposed at a position in which a magnetic flux from said drive magnet and a magnetic flux from said drive coils are canceled with each other.

2. A three-phase brushless motor as recited in claim 1, wherein said magnetic sensor is disposed so that a line passing through the center of one drive coil among said plurality of drive coils and said rotation axis lies in an angular range of (0.25+/−0.1) times said predetermined arrangement pitch angle Pc with respect to a line passing through the center of said magnetic sensor and said rotation axis, said one drive coil having another drive coil adjacent in an opposite direction of rotation of said rotation axis.

3. A three-phase brushless motor as recited in claim 1, wherein said rotation detecting magnet has the different number of magnetized poles from the number of poles in said drive magnet and is a ring-shaped magnet attached on an outer circumferential of said rotor yoke.

4. A three-phase brushless motor as recited in claim 1, wherein said rotation detecting magnet has the different number of a pair of North pole and South pole from the number of poles in said drive magnet and is a narrow magnet attached on an outer circumferential of said rotor yoke so as to generate one rotation signal.

* * * * *